United States Patent
Ren (10) Patent No.: US 10,728,189 B2
(45) Date of Patent: Jul. 28, 2020

(54) METHOD, DEVICE, STORAGE MEDIUM AND ELECTRONIC DEVICE FOR SENDING MULTIMEDIA-MESSAGE

(71) Applicant: GUANGDONG OPPO MOBILE TELECOMMUNICATIONS CORP., LTD., Dongguan, Guangdong (CN)

(72) Inventor: Chao Ren, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/627,031

(22) PCT Filed: Jun. 14, 2018

(86) PCT No.: PCT/CN2018/091244
§ 371 (c)(1),
(2) Date: Dec. 27, 2019

(87) PCT Pub. No.: WO2019/015420
PCT Pub. Date: Jan. 24, 2019

(65) Prior Publication Data
US 2020/0127950 A1    Apr. 23, 2020

(30) Foreign Application Priority Data

Jul. 18, 2017  (CN) .......................... 2017 1 0586835

(51) Int. Cl.
*H04L 12/58* (2006.01)
*H04L 29/06* (2006.01)
(Continued)

(52) U.S. Cl.
CPC .............. *H04L 51/04* (2013.01); *H04L 51/10* (2013.01); *H04L 65/1016* (2013.01);
(Continued)

(58) Field of Classification Search
None
See application file for complete search history.

(56) References Cited

U.S. PATENT DOCUMENTS

| 7,590,696 B1 * | 9/2009 | Odell ................... G06Q 10/107 |
| | | 709/206 |
| 9,064,243 B2 * | 6/2015 | Singh ....................... H04B 1/06 |
| (Continued) | | |

FOREIGN PATENT DOCUMENTS

| CN | 102202010 | 9/2011 |
| CN | 102291699 | 12/2011 |
| (Continued) | | |

OTHER PUBLICATIONS

WIPO, ISR for PCT/CN2018/091244, dated Aug. 31, 2018.
(Continued)

*Primary Examiner* — Ernest G Tacsik
(74) *Attorney, Agent, or Firm* — Hodgson Russ LLP (57) ABSTRACT

A method of sending a multimedia-message. The method includes: obtaining a multimedia-message to be sent; storing the multimedia-message to be sent into a cache, when a RCS of the electronic device is not online; sending the multimedia-message in the cache by a manner of instant messaging (IM), when a waiting time for transmission is less than a preset time and an online notification of the RCS is received; and sending the multimedia-message in the cache by a manner of MMS, when the waiting time for transmission reaches the preset time and the online notification of the RCS is not received.

20 Claims, 5 Drawing Sheets

(51) Int. Cl.
*H04L 29/08* (2006.01)
*H04W 4/12* (2009.01)
*H04W 28/14* (2009.01)

(52) U.S. Cl.
CPC .......... *H04L 65/1066* (2013.01); *H04L 67/24* (2013.01); *H04L 67/2842* (2013.01); *H04W 4/12* (2013.01); *H04W 28/14* (2013.01)

(56) References Cited

U.S. PATENT DOCUMENTS

| | | | |
|---|---|---|---|
| 9,135,227 B2* | 9/2015 | Warila | G06F 16/986 |
| 2004/0078444 A1* | 4/2004 | Malik | H04M 3/53366 |
| | | | 709/206 |
| 2005/0246185 A1* | 11/2005 | Brown | G06Q 50/22 |
| | | | 705/2 |
| 2008/0040675 A1* | 2/2008 | Canfield | G06F 3/0481 |
| | | | 715/752 |
| 2008/0065758 A1* | 3/2008 | Narayanaswami | G06Q 10/107 |
| | | | 709/224 |
| 2008/0114881 A1 | 5/2008 | Lee et al. | |
| 2008/0209417 A1* | 8/2008 | Jakobson | G06F 9/4856 |
| | | | 718/100 |
| 2009/0234922 A1* | 9/2009 | Appelman | H04L 51/14 |
| | | | 709/206 |
| 2009/0305632 A1* | 12/2009 | Sarkissian | H04M 1/6066 |
| | | | 455/41.2 |
| 2010/0167766 A1* | 7/2010 | Duarte | H04L 65/1069 |
| | | | 455/466 |
| 2010/0205268 A1* | 8/2010 | Zhu | H04L 69/18 |
| | | | 709/206 |
| 2010/0205539 A1* | 8/2010 | Gestsson | H04L 51/04 |
| | | | 715/752 |
| 2011/0249650 A1* | 10/2011 | Seppanen | H04L 65/1083 |
| | | | 370/331 |
| 2012/0173638 A1* | 7/2012 | Vymenets | G06Q 10/103 |
| | | | 709/206 |
| 2013/0172026 A1* | 7/2013 | Odell | H04W 4/12 |
| | | | 455/466 |
| 2014/0141821 A1* | 5/2014 | Dietz | H04W 4/08 |
| | | | 455/466 |
| 2014/0181312 A1* | 6/2014 | Rutten | H04L 67/10 |
| | | | 709/227 |
| 2014/0213306 A1* | 7/2014 | Blankenship | H04L 69/24 |
| | | | 455/457 |
| 2014/0226657 A1* | 8/2014 | Bouvet | H04L 65/1053 |
| | | | 370/352 |
| 2014/0337989 A1* | 11/2014 | Orsini | G06F 40/51 |
| | | | 726/26 |
| 2014/0378105 A1 | 12/2014 | Suryavanshi | |
| 2015/0066641 A1* | 3/2015 | Dudley | G06Q 30/0253 |
| | | | 705/14.51 |
| 2015/0350983 A1* | 12/2015 | Kwok | H04L 65/1016 |
| | | | 370/331 |
| 2016/0286027 A1* | 9/2016 | Lee | H04L 51/066 |
| 2016/0330161 A1* | 11/2016 | Chakravarthy | H04L 51/30 |
| 2016/0353333 A1* | 12/2016 | Jamadagni | H04W 36/0055 |
| 2017/0063739 A1* | 3/2017 | Lair | H04L 51/043 |
| 2017/0104704 A1* | 4/2017 | Choi | H04L 51/046 |
| 2017/0186115 A1* | 6/2017 | Sheppard | G01S 19/13 |
| 2017/0242894 A1* | 8/2017 | Kephart | G06F 16/248 |
| 2017/0302499 A1* | 10/2017 | Ding | H04L 29/06 |
| 2017/0374504 A1* | 12/2017 | Synal | H04W 4/021 |
| 2018/0183741 A1* | 6/2018 | Dar | H04L 51/10 |
| 2019/0116140 A1* | 4/2019 | Bailly | H04W 4/14 |
| 2019/0222550 A1* | 7/2019 | Yau | H04L 51/36 |
| 2020/0100100 A1* | 3/2020 | Raymond | H04L 51/043 |

FOREIGN PATENT DOCUMENTS

| | | |
|---|---|---|
| CN | 102624641 | 8/2012 |
| CN | 102984690 | 3/2013 |
| CN | 103685330 | 3/2014 |
| CN | 105764020 | 7/2016 |
| CN | 105848096 | 8/2016 |
| CN | 105871686 | 8/2016 |
| CN | 106060951 | 10/2016 |
| CN | 106789549 | 5/2017 |
| CN | 107395490 | 11/2017 |
| EP | 3073682 | 9/2016 |
| WO | 2017105630 | 6/2017 |

OTHER PUBLICATIONS

SIPO, First Office Action for CN Application No. 201710586835.3, dated Jun. 4, 2019.

EPO, Office Action for EP Application No. 18834495.6, dated Apr. 20, 2020.

* cited by examiner

METHOD, DEVICE, STORAGE MEDIUM AND ELECTRONIC DEVICE FOR SENDING MULTIMEDIA-MESSAGE

CROSS-REFERENCE TO RELATED APPLICATION

This application is a U.S. national phase application of International Application No. PCT/CN2018/091244, filed on Jun. 14, 2018, which claims priority to Chinese application No. 201710586835.3, filed on Jul. 18, 2017. The entire disclosures of the above-mentioned applications are hereby incorporated by reference herein.

TECHNICAL FIELD

The present disclosure relates to communications technical field, and particularly to a method, a device, an electronic device and a storage medium for sending multimedia-message.

BACKGROUND

Rich Communication Services (RCS) is defined by the GSM Association (GSMA) to specify services based on the IP Multimedia Subsystem (IMS), as specified by the $3^{rd}$ Generation Partnership Program (3GPP). When an electronic device supporting an RCS technology sends a multimedia-message, it generally uses a manner of instant messaging if the network is available, and uses a manner of short message or a multimedia message if the network is unavailable. However, the fee for sending a multimedia message is relatively high. When the network is not online, the transmission of the multimedia-message may result in waste of costs. Therefore, further improvement is needed.

SUMMARY

The present disclosure provides a method, a device, an electronic device and a storage medium for sending multimedia-message, which can delay sending a multimedia-message, effectively reducing the number of sending multimedia messages and reducing unnecessary charges.

The present disclosure provides a method for sending multimedia-message, which is applied to an electronic device, the method includes:
 obtaining a multimedia-message to be sent;
 storing the multimedia-message to be sent into a cache, when a RCS of the electronic device is not online;
 sending the multimedia-message in the cache by a manner of instant messaging (IM), when a waiting time for transmission is less than a preset time and an online notification of the RCS is received; and
 sending the multimedia-message in the cache by a manner of Multimedia Messaging Service (MMS), when the waiting time for transmission reaches the preset time and the online notification of the RCS is not received.

The present disclosure provides a device for sending multimedia-message, the device includes:
 an acquiring module, configured to acquire the multimedia-message to be sent;
 a cache module, configured to store the multimedia-message to be sent into a cache when a RCS of the electronic device is not at an online state;
 a first sending module, configured to send the multimedia-message in the cache by a manner of IM, when a waiting time for transmission is less than the preset time and a receiving of an online notification of the RCS; and
 a second sending module, configured to send the multimedia-message in the cache by a manner of MMS, when the waiting time for transmission reaches a preset time and the online notification of the RCS is not received.

The present disclosure further provides a storage medium, having a computer program stored therein, a computer being enabled to perform the method of sending the multimedia message of any embodiment of the present disclosure when executing the computer program.

The present disclosure further provides an electronic device, including a memory and a processor, by using a computer program stored in the memory, to perform the following operations of:
 obtaining a multimedia-message to be sent;
 storing the multimedia-message to be sent into a cache, when the RCS of the electronic device is not online;
 sending the multimedia-message in the cache by a manner of IM, when a waiting time for transmission is less than a preset time and an online notification of the RCS is received; and
 sending the multimedia-message in the cache by a manner of MMS, when the waiting time for transmission reaches the preset time and the online notification of the RCS is not received.

BRIEF DESCRIPTION OF THE DRAWINGS

Specific embodiments of the disclosure are described in detail below with reference to the accompanying drawings, thereby the technical solutions and other advantageous effects of the present disclosure will be apparent.

DETAILED DESCRIPTION OF PREFERRED EMBODIMENTS

The present disclosure will be further described in detail below with reference to the accompanying drawings and embodiments. It is understood that the specific embodiments described herein are merely illustrative of the disclosure and are not intended to limit the disclosure. It should also be noted that, for the convenience of description, only some, but not all of the structures related to the present disclosure are shown in the drawings. All other embodiments obtained by those skilled in the art based on the embodiments of the present disclosure without creative efforts are within the scope of the present disclosure.

The terms "first" and "second" and the like in the present disclosure are used to distinguish different objects, and are not intended to describe a specific order. Furthermore, the terms "includes" and "including" are intended to cover a non-exclusive inclusion. For example, a process, method, system, product, or device that includes a series of operations or modules is not limited to the listed operations or modules, but optionally includes operations or modules not listed, or alternatively other operations or modules inherent to these processes, methods, products or equipment.

References to "an embodiment" herein mean that a particular feature, structure, or characteristic described in connection with the embodiments can be included in at least one embodiment of the disclosure. The appearances of the phrases in various places in the specification are not necessarily referring to the same embodiments, and are not exclusive or alternative embodiments that are mutually exclusive. Those skilled in the art will understand and implicitly understand that the embodiments described herein can be combined with other embodiments.

An execution body of a method for sending a multimedia-message according to an embodiment of the present disclosure may be a device for sending a multimedia-message or an electronic device (such as a handheld computer, the tablet, the smart phone and the like) that integrates the device for sending the multimedia-message. The device for sending the multimedia-message can be implemented by using hardware or software.

Figure 1:
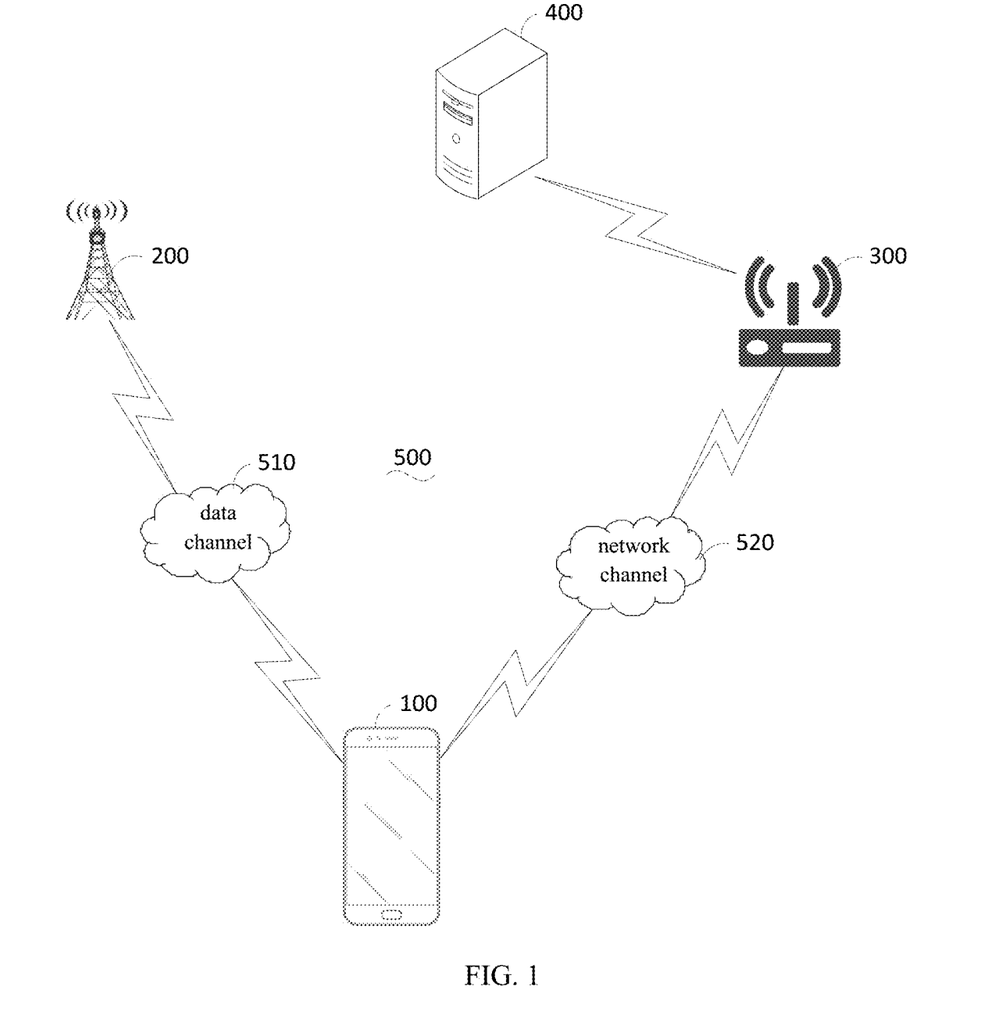
FIG. 1 is a schematic diagram of an application environment of a method for sending a multimedia-message according to an embodiment of the present disclosure.

FIG. 1 is a schematic diagram of an application environment of a method for sending a multimedia-message according to an embodiment of the present disclosure. The application environment includes an electronic device 100, a base station 200, a network hotspot 300, an operator server 400, and a communication network 500.

The electronic device 100 includes a service interface of a Rich Communication Service (RCS), wherein the RCS may be implemented by a built-in function customized by the electronic device 100 or a downloaded application. The electronic device 100 selects the base station 200 or the operator server 400 to support a Multimedia Messaging Service (MMS), according to the size of the data amount of the MMS.

The base station 200 is configured to support the MMS in a conventional manner, and send the MMS by a data channel 510 between the base station 200 and the electronic device 100. It can be understood that the MMS sent by the base station 200 is recorded in the user's communication package, and if there is an excess, the excess is generally charged according to the network traffic.

The operator server 400 is configured to receive the MMS and send the MMS through a network channel 520 between the electronic device 10 and itself. The advantage of the network service is that the price is low, and the disadvantage is that it is not as dense as the base station 200. Thus, there may be a connection failure or a busy system, which may result in a failure of sending the MMS or a too long delay of the MMS.

When the operator server 400 fails to send, the operator server 400 notifies the electronic device 100 to send the MMS through the base station 200 when the transmission condition is satisfied. It will be appreciated that the transmission through the operator server 400 is generally free.

The communication network 500, including the data channel 510 and the network channel 520, is configured to support the transmission of communication information. The data channel 510 is constructed by the base station 200 and the electronic device 100. The network channel 520 is constructed by the operator server 400, the network hotspot 300, and the electronic device 100, and includes a combination of one or more of a wireless wide area network, a wireless local area network, a wireless metropolitan area network, and/or a personal network.

The network hotspot 300 is connected between the electronic device 100 and the operator server 400, and is configured for sending the multimedia-message service from the electronic device 100 to another network hotspot via the operator server 400 until sending the multimedia-message to another electronic device. Preferably, it is a Wi-Fi hotspot designated by the user, such as a Wi-Fi hotspot in the home, in an office, or in a shopping mall.

In the embodiment of the present disclosure, a multimedia-message to be sent is obtained by the electronic device 100. The electronic device 100 stores the multimedia-message to be sent in a cache, when the RCS of the electronic device 100 is not in the online state. When a waiting time for transmission is less than a preset time and the electronic device 100 receives a notification that the RCS is online, the electronic device 100 sends the multimedia-message in the cache to the network hotspot 300 through the network channel 520 by a manner of instant massaging (IM). Then the electronic device 100 sends the multimedia-message to another network hotspot through the operator server 400, until the multimedia-message is sent to another electronic device. When the waiting time for transmission reaches the preset time and the notification is not received that the RCS is online, the electronic device 100 sends the multimedia-message in the cache by a manner of MMS via the data channel 510 and the base station 200.

An embodiment of the present disclosure provides a method for sending a multimedia-message, the method includes:

obtaining a multimedia-message to be sent;

storing the multimedia-message to be sent into a cache, when a RCS of the electronic device is not online;

sending the multimedia-message in the cache by a manner of IM, when a waiting time for transmission is less than a preset time and an online notification of the RCS is received;

sending the multimedia-message in the cache by a manner of MMS, when the waiting time for transmission reaches the preset time and the online notification of the RCS is not received.

In some embodiments, the operation of sending the multimedia-message in the cache by a manner of IM, when the waiting time for transmission is less than the preset time and an online notification of the RCS is received, includes:

sending the multimedia-message in the cache by a manner of IM, according to an order of storing the multimedia-messages in the cache from first to last.

In some embodiments, the operation of sending the multimedia-message in the cache by a manner of IM, when the waiting time for transmission is less than the preset time and an online notification of the RCS is received, includes:

sending the multimedia-message in the cache by a manner of IM, according to an order of the data volume of the multimedia-message in the cache from small to large.

In some embodiments, the operation of sending the multimedia-message in the cache by a manner of MMS, when the waiting time for transmission reaches the preset time and the online notification of the RCS is not received, includes:

sending the multimedia-message in the cache by a manner of MMS, when the waiting time for transmission is greater than and/or equal to the preset time.

In some embodiments, before the operation of storing the multimedia-message to be sent into a cache, when a RCS of the electronic device is not online, the method further includes:

detecting whether the number of remaining multimedia messages in the current communication package of the electronic device is greater than a preset number;

sending the multimedia-message to be sent by a manner of MMS, when the number of the remaining multimedia messages in the current communication package of the electronic device is greater than the preset number;

storing the multimedia-message to be sent in the cache, when the number of the remaining multimedia messages in the current communication package of the electronic device is less than the preset number or equal to the preset number.

In some embodiments, after obtaining a multimedia-message to be sent, the method further includes:

sending the multimedia-message to be sent by a manner of IM when the RCS of the electronic device is in an online state.

In some embodiments, the operation of sending the multimedia-message in the cache by a manner of IM, when a waiting time for transmission is less than a preset time and a receiving of an online notification of the RCS, includes:

sending the multimedia-message in the cache by a manner of IM, according to the data volume of the multimedia-message in the cache from small to large.

Figure 2:
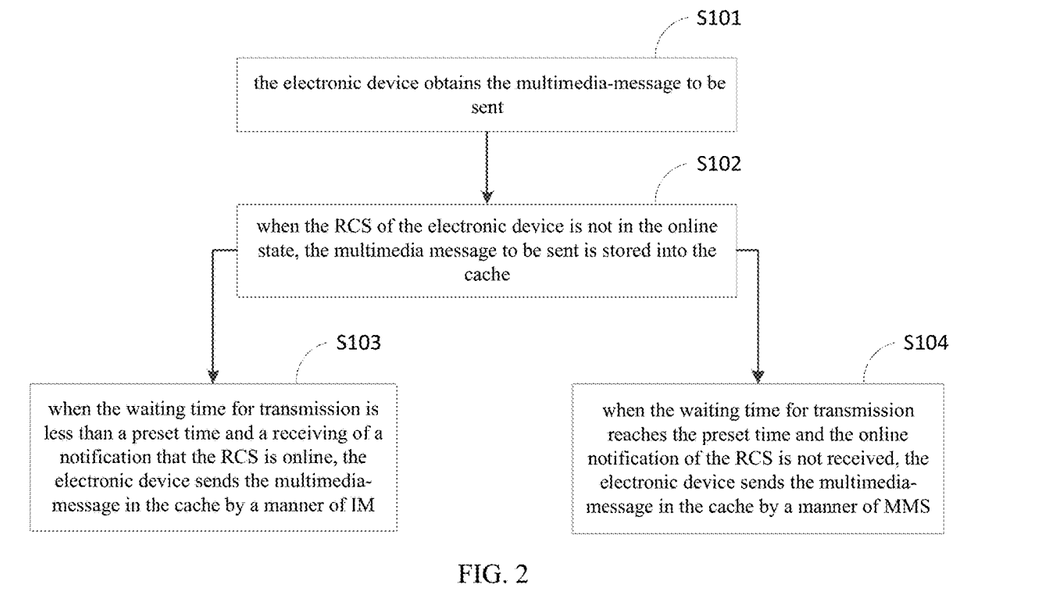
FIG. 2 is a schematic flowchart of a method for sending a multimedia-message according to an embodiment of the present disclosure.

FIG. 2 is a schematic flowchart diagram of a method for sending a multimedia-message according to an embodiment of the present disclosure. The method is applied to an electronic device supporting a converged communication technology. As illustrated in FIG. 2, the method may include the following operations.

In an operation S101, the electronic device obtains a multimedia-message to be sent.

The multimedia-message to be sent can be obtained, when a user edits a multimedia-message on the electronic device and inputs a sending instruction, or, when receiving the instruction that the user forwards a received multimedia-message. The multimedia-message refers to media information in the form of text, image, video, audio, animation, and the like. Such as pictures, images, sounds, locations, files and other news.

In an operation S102, when the RCS of the electronic device is not in the online state, the multimedia message to be sent is stored into the cache.

The state of the RCS of the electronic device can be determined by detecting whether the IM of the electronic device is normally received and sent. For example, when it is detected that the IM of the electronic device is normally received and sent, it is determined that the RCS of the electronic device is in an online state. When it is detected that the IM of the electronic device cannot be normally sent and received, it is determined that the RCS of the electronic device is not in an online state.

The state of the RCS of the electronic device may be determined by sequentially detecting whether the electronic device has a valid configuration file, whether the network is connected, and whether it can successfully register to an IP Multimedia Core Network Subsystem (IMS) network. For example, when the electronic device does not have a valid configuration file, it is determined that the RCS of the electronic device is not at the online state. When the electronic device has a valid configuration file, it is further detected whether the network of the electronic device is connected. When the network of the electronic device is not connected, it is determined that the RCS of the electronic device is not at the online state. When the network of the electronic device is connected, it is further detected whether the electronic device can successfully register to the IMS network of the RCS. When the IMS network of the RCS cannot be successfully registered, the RCS of the electronic device is not at the online state. When successfully registered to the IMS network of the RCS, it is determined that the RCS of the electronic device is at the online state.

The multimedia-message to be sent is sent by a manner of IM, when the RCS of the electronic device is in an online state. When the RCS of the electronic device is not in an online state, the electronic device stores the multimedia-message to be sent in a cache to wait for sending.

The cache is an area defined by the buffer space of the electronic device for storing the multimedia-message to be sent, and the cache may be identified as a waiting cache.

In some embodiments, when the multimedia-message to be sent is stored in the cache, the electronic device can generate a message, and the message is shown on a display interface of the electronic device to remind the user that the multimedia-message is to be sent when it is detected the RCS of the electronic device is at the online state.

In an operation S103, when the waiting time for transmission is less than a preset time and a receiving of a notification that the RCS is online, the electronic device sends the multimedia-message in the cache by a manner of IM.

The preset time may be set by a user, for examples of setting as 10 minutes, 30 minutes, 1 hour, 4 hours, etc. The preset time may also be set by the device manufacturer before the electronic device is shipped from the factory. After the multimedia-message waited to be sent is stored in the cache, the waiting time for transmission starts from the time that a first multimedia-message is stored in the cache. When the waiting time for transmission is within the preset time, the RCS of the electronic device may be at the online state again. So that the RCS of the electronic device may be detected in the background at intervals of the preset time. When the RCS of the electronic device is detected at the online state again, an online notification is triggered. When the waiting time for transmission is less than the preset time and the electronic device receives the online notification of the RCS, the electronic device sends the multimedia-message in the cache by a manner of IM immediately.

For example, the preset time is set as 1 hour. After a number of multimedia-messages to be sent are stored into the cache, the waiting time for transmission is counted from the time that a first one of the multimedia-messages is stored in the cache. For example, the time of the first multimedia-message stored in the cache is at 9:15, during the waiting time for transmission of 9:15 to 10:14, the RCS of the electronic device may be at the online state again. So from 9:15 to 10:15, it is detected in the background whether the RCS of the electronic device is online again every 5 minutes. When it is detected that the RCS of the electronic device is successfully launched again, the online notification is triggered. During the waiting time for transmission from 9:15 to 10:14, when the electronic device receives the online notification, the electronic device sends the multimedia-messages in the cache by a manner of IM immediately.

In some embodiments, when the waiting time for transmission is less than the preset time, and the online notification is received, the electronic device sends the multimedia-message in the cache by a manner of IM, as follows:

The electronic device sends the multimedia-message in the cache by a manner of IM according to the order of storing the multimedia messages in the cache from first to last.

In some embodiments, when the waiting time for transmission is less than the preset time, and receives the online notification of the RCS, the electronic device sends the multimedia-message in the cache by a manner of IM, as follows:

The electronic device sends the multimedia-message by a manner of IM, according to an order of the data volume of the multimedia-message in the cache from small to large.

In an operation S104, when the waiting time for transmission reaches the preset time and the online notification of the RCS is not received, the electronic device sends the multimedia-message in the cache by a manner of MMS.

When the waiting time for transmission reaches the preset time, a message timeout event is triggered, and it is detected whether the RCS of the electronic device is online again. When it is detected that the RCS of the electronic device is still not online, or the online notification of the RCS is still not received, the electronic device sends the multimedia-message in the cache by a manner of MMS.

In some embodiments, when the waiting time for transmission reaches the preset time and notification is not received that the RCS is online, the electronic device sends the multimedia-message in the cache by a manner of IM, as follows:

The electronic device sends the multimedia-message in the cache by a manner of MMS, when the waiting time for transmission is greater than and/or equal to the preset time.

In some embodiments, when the RCS of the electronic device is not in the online state, before the electronic device stores the multimedia-message to be sent into the cache, the method further includes:

detecting whether the number of remaining multimedia messages in the current communication package of the electronic device is greater than a preset number;

when the number of the remaining multimedia messages in the current communication package of the electronic device is greater than the preset number, sending the multimedia-message to be sent by a manner of MMS;

when the number of the remaining multimedia messages in the current communication package of the electronic device is less than or equal to the preset number, storing the multimedia-message to be sent in the cache.

All of the above optional technical solutions may be used in any combination to form an optional embodiment of the present disclosure, and will not be further described herein.

Figure 3:
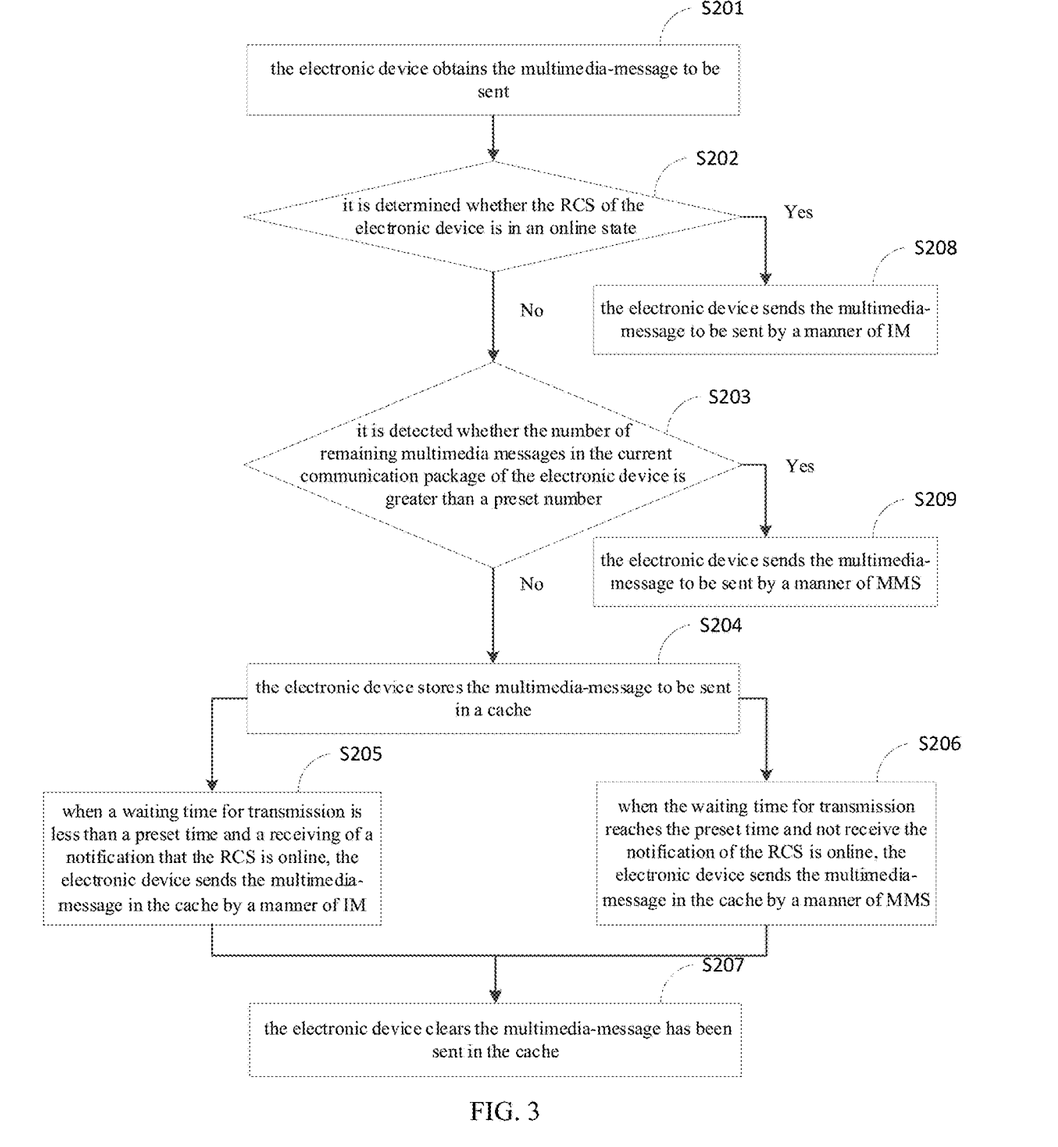
FIG. 3 is a schematic flowchart of another method for sending a multimedia-message according to an embodiment of the present disclosure.

FIG. 3 is another schematic flowchart of a method for sending a multimedia-message according to an embodiment of the present disclosure. The method may include the following operations.

In operation S201, the electronic device obtains the multimedia-message to be sent.

The multimedia-message to be sent can be obtained, when a user edits a multimedia-message on the electronic device and inputs a sending instruction, or, when receiving the instruction that the user forwards a received multimedia-message. The multimedia-message refers to media information in the form of text, image, video, audio, animation, and the like. Such as pictures, images, sounds, locations, files and other news.

In operation S202, it is determined whether the RCS of the electronic device is in an online state. If not, a next operation S203 is executed; if yes, a following operation S208 is executed.

The state of the RCS of the electronic device can be determined by detecting whether the IM of the electronic device is normally received and sent. For example, when it is detected that the IM of the electronic device is normally received and sent, it is determined that the RCS of the electronic device is in an online state. When it is detected that the IM of the electronic device cannot be normally sent and received, it is determined that the RCS of the electronic device is not in an online state.

The state of the RCS of the electronic device may be determined by sequentially detecting whether the electronic device has a valid configuration file, whether the network is connected, and whether it can successfully register to an IP Multimedia Core Network Subsystem (IMS) network. For example, when the electronic device does not have a valid configuration file, it is determined that the RCS of the electronic device is not at the online state. When the electronic device has a valid configuration file, it is further detected whether the network of the electronic device is connected. When the network of the electronic device is not connected, it is determined that the RCS of the electronic device is not at the online state. When the network of the electronic device is connected, it is further detected whether the electronic device can successfully register to the IMS network of the RCS. When the IMS network of the RCS cannot be successfully registered, the RCS of the electronic device is not at the online state. When successfully registered to the IMS network of the RCS, it is determined that the RCS of the electronic device is at the online state.

In operation S203, it is detected whether the number of remaining multimedia messages in the current communication package of the electronic device is greater than a preset number. If no, an operation S204 is executed; if yes, an operation S209 is executed.

The electronic devices have a free number of MMS messages in the communication package for a fixed period of time. For example, a monthly communication package includes 30 free MMS messages. When the RCS of the electronic device is not in the online state, the free MMS resources in the communication package can be reasonably utilized, and the multimedia-message is sent by using the MMS within the communication package. It can avoid the generation of additional tariffs and ensure the timeliness of multimedia-message. For example, when the RCS of the electronic device is not in the online state, it is detected whether the number of the remaining multimedia messages in the current communication package of the electronic device is greater than a preset number. For example, the number of the remaining multimedia messages in the current communication package can be obtained by monitoring and recording data of the monitoring software. The monitoring software updates the recorded information according to the communication package margin displayed on the official website of the operator when the monitoring software is connected to the network. The monitoring software counts the number of MMS messages that occurred during the current time to the most recent update time in the non-networked state, so as to accurately calculate the number of remaining multimedia messages in the current communication package. For example, the preset number may be determined according to a percentage corresponding to the number of multimedia messages of the communication package in a fixed period of time. For example, the number of multimedia messages of the monthly communication package is 50, and the preset number is a multimedia message of the communication package. 20% of the number of bars, that is, the preset number is 10. The preset number can be set by the user. For example, if the number of remaining multimedia messages in the current communication package is 30, which is greater than the preset number of 10, the operation S209 is executed to send the multimedia-message to be sent by a manner of MMS. For example, if the number of remaining multimedia messages in the current communication package is 8 and less than the preset number of 10, the operation S204 is executed to store the multimedia-message to be sent into the cache.

In operation S204, the electronic device stores the multimedia-message to be sent in a cache.

When the number of remaining multimedia messages in the current communication package of the electronic device is less than the preset number or equal to the preset number, the free multimedia messages in the current communication package are less. In order to avoid generating additional charges, cannot send the multimedia-message by a manner of MMSs temporarily. Then the electronic device can store the multimedia-message to be sent in a cache to wait for sending.

The cache is an area defined by the buffer space of the electronic device for storing the multimedia-message to be sent, and the cache may be identified as a waiting cache.

In some embodiments, when the multimedia-message to be sent is stored in the cache, the electronic device can generate a message, and the message is shown on a display interface of the electronic device to remind the user that the multimedia-message is to be sent when it is detected the RCS of the electronic device is at the online state.

In operation S205, when a waiting time for transmission is less than a preset time and a receiving of a notification that the RCS is online, the electronic device sends the multimedia-message in the cache by a manner of IM.

The preset time may be set by a user, for examples of setting as 10 minutes, 30 minutes, 1 hour, 4 hours, etc. The preset time may also be set by the device manufacturer before the electronic device is shipped from the factory. After the multimedia-message waited to be sent is stored in the cache, the waiting time for transmission starts from the time that a first multimedia-message is stored in the cache. When the waiting time for transmission is within the preset time, the RCS of the electronic device may be at the online state again. So that the RCS of the electronic device may be detected in the background at intervals of the preset time. When the RCS of the electronic device is detected at the online state again, an online notification is triggered. When the waiting time for transmission is less than the preset time and the electronic device receives the online notification of the RCS, the electronic device sends the multimedia-message in the cache by a manner of IM immediately.

For example, the preset time is set as 1 hour. After a number of multimedia-messages to be sent are stored into the cache, the waiting time for transmission is counted from the time that a first one of the multimedia-messages is stored in the cache. For example, the time of the first multimedia-message stored in the cache is at 9:15, during the waiting time for transmission of 9:15 to 10:14, the RCS of the electronic device may be at the online state again. So from 9:15 to 10:15, it is detected in the background whether the RCS of the electronic device is online again every 5 minutes. When it is detected that the RCS of the electronic device is successfully launched again, the online notification is triggered. During the waiting time for transmission from 9:15 to 10:14, when the electronic device receives the online notification, the electronic device sends the multimedia-messages in the cache by a manner of IM immediately.

In some embodiments, when the waiting time for transmission is less than the preset time, and receives the notification that the RCS is online, the electronic device sends the multimedia-message in the cache by a manner of IM, as follows:

The electronic device sends the multimedia-message in the cache by a manner of IM according to the order of storing the multimedia messages in the cache from first to last.

For example, the preset time is set as T time. In the T time, when it is detected that the RCS network of the electronic device is successfully launched again, the online notification is triggered. When the electronic device receives the notification that the RCS is online, it checks whether there is a multimedia-message waiting for sending in the cache, and if there is a multimedia-message waiting for sending, the electronic device sends the multimedia-message in the cache by the order of time. If there is no multimedia-message waiting for sending in the cache, the process ends.

In some embodiments, when the waiting time for transmission is less than the preset time, and receives the notification that the RCS is online, the electronic device sends the multimedia-message in the cache by a manner of IM, as follows:

The electronic device sends the multimedia-message by a manner of IM, according to an order of the data volume of the multimedia-message in the cache from small to large.

For example, in a cache, there may be multiple multimedia-messages waiting to be sent with different data sizes. A multimedia-message with a large amount of data needs to consume more data traffic to send. Some MMS messages are charged according to the size of the send traffic. In order to reduce the probability of sending large amounts of data in the MMS, the electronic device can send multimedia-messages with a large amount of data when networking, to send more multimedia-messages with a larger amount of data during the networking phase. When the waiting time for transmission is less than the preset time, and receive the notification of the RCS is online, the electronic device can send the multimedia-message in the cache according to the data amount of the multimedia-message from large to small by a manner of IM.

In some embodiments, the electronic device can send the multimedia-message in the cache by a manner of IM in order of the data amount of the multimedia-message from small to large.

For example, in the cache, there may be multiple multimedia messages waiting to be sent with different data sizes. Some MMS charges are not differentiated according to the amount of message data, and are only charged according to the number of sent messages. In order to reduce the number of MMS messages in the MMS, the electronic device can send the multimedia-messages with a small amount of data when networking, to send more multimedia-messages with a smaller amount of data during the networking phase. When the waiting time for transmission is less than the preset time, and receive the notification of the RCS is online, the electronic device can send the multimedia-message in the cache according to the data amount of the multimedia-message from small to large by a manner of IM.

In operation S206, when the waiting time for transmission reaches the preset time and not receive the notification of the RCS is online, the electronic device sends the multimedia-message in the cache by a manner of MMS.

When the waiting time for transmission reaches the preset time, a message timeout event is triggered, and it is detect whether the RCS of the electronic device is online again.

When it is detected that the RCS of the electronic device is still not online, or the online notification of the RCS is still not received, the electronic device sends the multimedia-message in the cache by a manner of MMS.

In some embodiments, when the waiting time for transmission reaches the preset time and notification is not received that the RCS is online, the electronic device sends the multimedia-message in the cache by a manner of IM, as follows:

The electronic device sends the multimedia-message in the cache by a manner of MMS, when the waiting time for transmission is greater than and/or equal to the preset time.

For example, the preset time is set as T time, and when the waiting time for transmission reaches the T time, the message timeout event is triggered. The electronic device searches the multimedia-message waiting for sending time is greater than and/or equal to the T time from the cache, and sends the multimedia-message by MMS. The multimedia-message waiting for the transmission time less than the T time in the cache will continue to wait.

In operation S207, the electronic device clears the multimedia-message has been sent in the cache.

The multimedia-message that has been sent in the cache is cleared after the multimedia-message in the cache is sent by a manner of IM. The multimedia-message that has been sent in the cache is cleared after the multimedia-message in the cache is sent by a manner of MMS.

In operation S208, the electronic device sends the multimedia-message to be sent by a manner of IM.

When the RCS of the electronic device is in an online state, the electronic device sends the multimedia-message to be sent through the channel of IM to send the multimedia-message by a manner of IM.

In operation S209, the electronic device sends the multimedia-message to be sent by a manner of MMS.

If the number of the remaining multimedia messages in the current communication package of the electronic device is greater than the preset number, it indicates that the free multimedia message resources in the current communication package are relatively abundant. Then the electronic device can send the multimedia-message to be sent by a manner of MMS. It can avoid additional charges and guarantee the timeliness of multimedia-messages.

The embodiment of the present disclosure obtains the multimedia-message to be sent, and when the RCS of the electronic device is not in the online state, the multimedia-message to be sent is stored in the cache. When the waiting time for transmission is less than the preset time and a receiving of an online notification that the RCS is online, the multimedia-message in the cache is sent by a manner of IM. When the waiting time for transmission reaches the preset time and the online notification of the RCS is not received, the multimedia-message in the cache is sent by a manner of MMS. The embodiment of the disclosure can delay sending a multimedia-message, effectively reduce the number of sending multimedia messages and reduce unnecessary charges.

The embodiment of the disclosure further provides a device for sending a multimedia-message, the device includes the following modules:

an acquiring module, configured to acquire the multimedia-message to be sent;

a cache module, configured to store the multimedia-message to be sent into a cache when a RCS of the electronic device is not in an online state;

a first sending module, configured to send the multimedia-message in the cache by a manner of IM, when a waiting time for transmission is less than the preset time and a receiving of an online notification of the RCS; and a second sending module, configured to send the multimedia-message in the cache by a manner of MMS, when the waiting time for transmission reaches a preset time and the online notification of the RCS is not received.

In some embodiments, the first sending module is further configured to send the multimedia-message in the cache by a manner of IM according to an order of storing the multimedia-messages in the cache from first to last.

In some embodiments, the first sending module is further configured to send the multimedia-message in the cache by a manner of IM according to an order of the data volume of the multimedia-message in the cache from small to large.

In some embodiments, the second sending module is further configured to send the multimedia-message in the cache by a manner of MMS, when the waiting time for transmission is greater than and/or equal to the preset time.

In some embodiments, the device further includes:

a detecting module, configured to detect whether the number of a remaining multimedia messages in the current communication package of the electronic device is greater than a preset number;

wherein the second sending module is further configured to send the multimedia-message to be sent by a manner of MMS when the number of the remaining multimedia messages in the current communication package of the electronic device is greater than a preset number;

wherein the cache module is further configured to store the multimedia-message to be sent into a cache when the number of the remaining multimedia messages in the current communication package of the electronic device is less than preset number or equal to a preset number.

Figure 4:
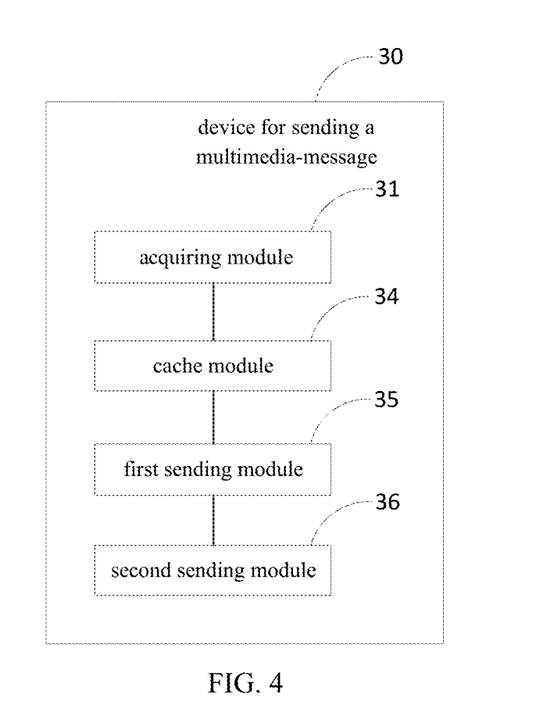
FIG. 4 is a schematic structural diagram of a device for sending a multimedia-message according to an embodiment of the present disclosure.

The embodiment of the present disclosure further provides a device for sending a multimedia-message. As shown in FIG. 4, FIG. 4 is a schematic structural diagram of a device for sending a multimedia-message according to an embodiment of the present disclosure. The device 30 for sending multimedia-message includes an acquiring module 31, a cache module 34, a first sending module 35, and a second sending module 36.

The acquiring module 31 is configured to obtain the multimedia-message to be sent.

The multimedia-message to be sent can be obtained by the acquiring module 31, when a user edits a multimedia-message on the electronic device and inputs a sending instruction, or, when receiving the instruction that the user forwards a received multimedia-message. The multimedia-message refers to media information in the form of text, image, video, audio, animation, and the like. Such as pictures, images, sounds, locations, files and other news.

The cache module 34, is configured to store the multimedia message to be sent into the cache, when the RCS of the electronic device is not in the online state.

The multimedia-message to be sent is sent by a manner of IM, when the RCS of the electronic device is in an online state. When the RCS of the electronic device is not in an online state, the cache module 34 stores the multimedia-message in a cache to wait for sending.

The first sending module 35, is configured to send the multimedia-message in the cache by a manner of IM, when the waiting time for transmission is less than the preset time and an online notification of the RCS is received.

The preset time may be set by a user, for examples of setting as 10 minutes, 30 minutes, 1 hour, 4 hours, etc. The preset time may also be set by the device manufacturer before the electronic device is shipped from the factory.

After the multimedia-message waited to be sent is stored in the cache, the waiting time for transmission starts from the time that a first multimedia-message is stored in the cache. When the waiting time for transmission is within the preset time, the RCS of the electronic device may be at the online state again. So that the RCS of the electronic device may be detected in the background at intervals of the preset time. When the RCS of the electronic device is detected at the online state again, an online notification is triggered. When the waiting time for transmission is less than the preset time and the electronic device receives the online notification of the RCS, the first sending module 35 sends the multimedia-message in the cache by a manner of IM immediately.

The second sending module 36, is configured to send the multimedia-message in the cache by a manner of MMS, when the waiting time for transmission reaches the preset time and the online notification of the RCS is not received.

When the waiting time for transmission reaches the preset time, a message timeout event is triggered, and it is detected whether the RCS of the electronic device is online again. When it is detected that the RCS of the electronic device is still not online, or the online notification of the RCS is still not received, the second sending module 36 sends the multimedia-message in the cache by a manner of MMS.

Figure 5:
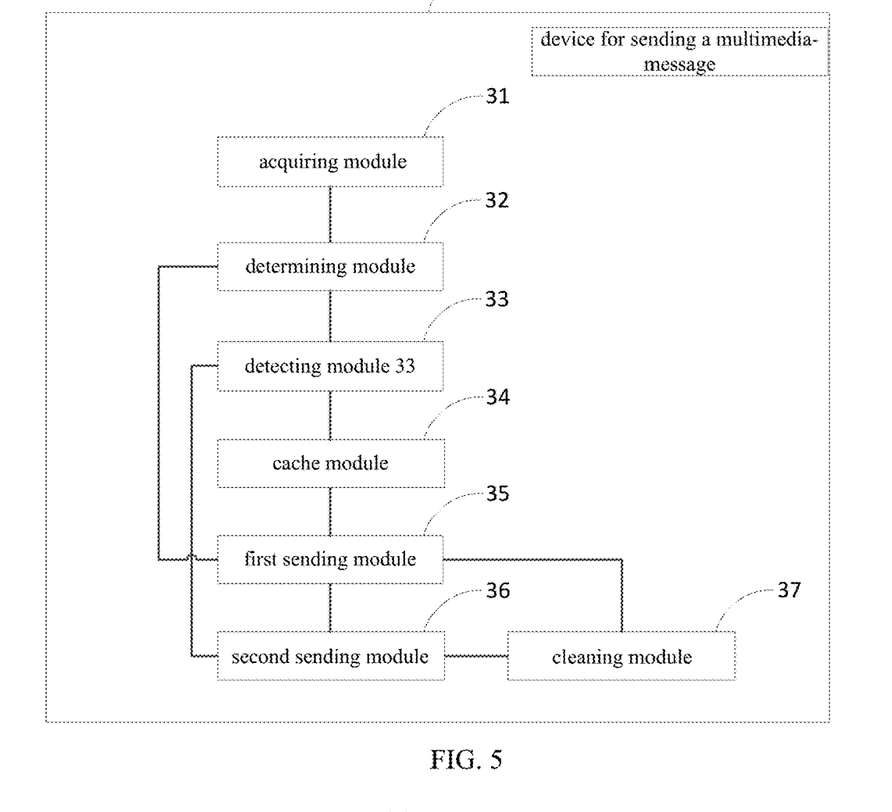
FIG. 5 is a schematic structural diagram of a device for sending a multimedia-message according to another embodiment of the present disclosure.

Referring to FIG. 5, FIG. 5 is another schematic structural diagram of a device for sending multimedia-message according to an embodiment of the present disclosure. The device 30 for sending the multimedia-message includes a determining module 32, a detecting module 33, a cache module 34, a first sending module 35, a second sending module 36, and a cleaning module 37.

The acquiring module 31 is configured to obtain the multimedia-message to be sent.

The multimedia-message to be sent can be obtained by the acquiring module 31, when a user edits a multimedia-message on the electronic device and inputs a sending instruction, or, when receiving the instruction that the user forwards a received multimedia-message. The multimedia-message refers to media information in the form of text, image, video, audio, animation, and the like. Such as pictures, images, sounds, locations, files and other news.

The determining module 32 is configured to determine whether the RCS of the electronic device is in an online state.

The determining module 32 can determine the state of the RCS of the electronic device by detecting whether the IM of the electronic device is normally received and sent. For example, the determining module 32 determines that the RCS of the electronic device is in an online state when it is detected that the IM of the electronic device is normally received and sent. The determining module 32 determines that the RCS of the electronic device is not in an online state, when it is detected that the IM of the electronic device cannot be normally sent and received.

The determining module 32 may determine the state of the RCS of the electronic device by sequentially detecting whether the electronic device has a valid configuration file, whether the network is connected, and whether it can successfully register to an IP Multimedia Core Network Subsystem (IMS) network. For example, when the electronic device does not have a valid configuration file, it is determined that the RCS of the electronic device is not at the online state. When the electronic device has a valid configuration file, it is further detected whether the network of the electronic device is connected. When the network of the electronic device is not connected, it is determined that the RCS of the electronic device is not at the online state. When the network of the electronic device is connected, it is further detected whether the electronic device can successfully register to the IMS network of the RCS. When the IMS network of the RCS cannot be successfully registered, the RCS of the electronic device is not at the online state. When successfully registered to the IMS network of the RCS, it is determined that the RCS of the electronic device is at the online state.

The detecting module 33 is configured to detect whether the number of remaining multimedia messages in the current communication package of the electronic device is greater than a preset number.

Many electronic devices have a free number of MMS messages in the communication package for a fixed period of time. For example, a monthly communication package includes 30 free MMS messages. When the RCS of the electronic device is not in the online state, the free MMS resources in the communication package can be reasonably utilized, and the multimedia-message is sent by using the MMS within the communication package, thereby avoiding the generation of additional tariffs and ensuring the timeliness of multimedia-message. For example, when the RCS of the electronic device is not in the online state, the detecting module 33 detects whether the number of remaining multimedia messages in the current communication package of the electronic device is greater than a preset number. For example, the number of remaining multimedia messages in the current communication package can be obtained by monitoring and recording data of the monitoring software. The monitoring software updates the recorded information according to the communication package margin displayed on the official website of the operator when the monitoring software is connected to the network. The monitoring software counts the number of MMS messages that occurred during the current time to the most recent update time in the non-networked state, so as to accurately calculate the number of remaining MMS messages in the current communication package. For example, the preset number may be determined according to a percentage corresponding to the number of multimedia messages of the communication package in a fixed period of time. For example, the number of multimedia messages of the monthly communication package is 50, and the preset number is a multimedia message of the communication package. 20% of the number of bars, that is, the preset number is 10. The preset number can be set by the user. For example, if the number of remaining multimedia messages in the current communication package is 30, the second obtaining module 36 sends the multimedia-message to be sent by a manner of MMS. For example, if the number of remaining multimedia messages in the current communication package is 8 and less than the preset number of 10, the cache module 34 stores the multimedia-message to be sent into the cache.

The cache module 34 is configured to store the multimedia-message to be sent into the cache, when the number of remaining multimedia messages in the current communication package of the electronic device is less than the preset number or equal to the preset number.

When the number of remaining multimedia messages in the current communication package of the electronic device is less than the preset number or equal to the preset number, the free MMS resources in the current communication package are less. In order to avoid generating additional charges, cannot send the multimedia-message by MMS temporarily. Then the cache module 34 can store the multimedia-message to be sent in a cache to wait for sending.

The cache is an area defined by the buffer space of the electronic device for storing the multimedia-message to be sent, and the cache may be identified as a waiting cache.

In some embodiments, when the multimedia-message to be sent is stored in the cache, the cache module 34 can generate a message, and the message is shown on a display interface of the electronic device to remind the user that the multimedia-message is to be sent when it is detected the RCS of the electronic device is at the online state.

The first sending module 35 is configured to send the multimedia-message in the cache by a manner of IM, when the waiting time for transmission is less than the preset time and a receiving of a notification that the RCS is online.

The preset time may be set by a user, for examples of setting as 10 minutes, 30 minutes, 1 hour, 4 hours, etc. The preset time may also be set by the device manufacturer before the electronic device is shipped from the factory. After the multimedia-message waited to be sent is stored in the cache, the waiting time for transmission starts from the time that a first multimedia-message is stored in the cache. When the waiting time for transmission is within the preset time, the RCS of the electronic device may be at the online state again. So that the RCS of the electronic device may be detected in the background at intervals of the preset time. When the RCS of the electronic device is detected at the online state again, an online notification is triggered. When the waiting time for transmission is less than the preset time and the electronic device receives the online notification of the RCS, the first sending module 35 sends the multimedia-message in the cache by a manner of IM immediately.

In some embodiments, the first sending module 35 is further configured to sends the multimedia-message in the cache by a manner of IM according to the order of storing the multimedia messages in the cache.

For example, the preset time is set as T time. In the T time, when it is detected that the RCS network of the electronic device is successfully launched again, the online notification is triggered. When the electronic device receives the notification that the RCS is online, it checks whether there is a multimedia-message waiting for sending in the cache, and if there is a multimedia-message waiting for sending, the first sending module 35 sends the multimedia-message in the cache by the order of time. If there is no multimedia-message waiting for sending in the cache, the process ends.

In some embodiments, the first sending module 35 is further configured to sends the multimedia-message by a manner of IM, according to an order of the data amount of the multimedia-message in the cache.

For example, in a cache, there may be multiple multimedia-messages waiting to be sent with different data sizes. A multimedia-message with a large amount of data needs to consume more data traffic to send. Some MMS messages are charged according to the size of the send traffic. In order to reduce the probability of sending large amounts of data in the MMS, the electronic device can send multimedia-messages with a large amount of data when networking, to send more multimedia-messages with a larger amount of data during the networking phase. When the waiting time for transmission is less than the preset time, and receive the notification of the RCS is online, the first sending module 35 can send the multimedia-message in the cache according to the data amount of the multimedia-message from large to small by a manner of IM.

In some embodiments, the first sending module 35 is configured to send the multimedia-message in the cache by a manner of IM in order of the data amount of the multimedia-message from small to large.

For example, in the cache, there may be multiple multimedia messages waiting to be sent with different data sizes. Some MMS charges are not differentiated according to the amount of message data, and are only charged according to the number of sent messages. In order to reduce the number of MMS messages in the MMS mode, the electronic device can send the multimedia-messages with a small amount of data when networking, to send more multimedia-messages with a smaller amount of data during the networking phase. When the waiting time for transmission is less than the preset time, and receive the notification of the RCS is online, the first sending module 35 can send the multimedia-message in the cache according to the data amount of the multimedia-message from small to large by a manner of IM.

The second sending module 36, is configured to send the multimedia-message in the cache by a manner of MMS, when the waiting time for transmission reaches the preset time and not receive the notification of the RCS is online.

When the waiting time for transmission reaches the preset time, the message timeout event is triggered, and detect whether the current converged communication of the electronic device is online again. When it is detected that the RCS of the electronic device is still not online, or not receive the notification of the RCS online, the second sending module 36 sends the multimedia-message in the cache by a manner of MMS.

In some embodiments, the second sending module 36 is further configured to sends the multimedia-message in the cache by a manner of MMS, when the waiting time for transmission is greater than and/or equal to the preset time.

For example, the preset time is set as T time, and when the waiting time for transmission reaches the T time, the message timeout event is triggered. The electronic device searches the multimedia-message waiting for sending time is greater than and/or equal to the T time from the cache, and sends the multimedia-message by MMS. The multimedia-message waiting for the transmission time less than the T time in the cache will continue to wait.

In some embodiments, the cleaning module 37 is configured to clear the multimedia-message has been sent in the cache.

The cleaning module 37 cleans the multimedia-message that has been sent in the cache after the multimedia-message in the cache is sent by a manner of IM. The cleaning module 37 cleans the multimedia-message that has been sent in the cache after the multimedia-message in the cache is sent by a manner of MMS.

In some embodiments, the first sending module 35 is configured to send the multimedia-message to be sent by a manner of IM, When the RCS of the electronic device is in an online state.

When the RCS of the electronic device is in an online state, the first sending module 35 sends the multimedia-message to be sent through the channel of instant communication to send the multimedia-message by a manner of IM.

In some embodiments, the second sending module 36 is configured send the multimedia-message to be sent by a manner of MMS.

If the number of the remaining multimedia messages in the current communication package of the electronic device is greater than the preset number, it indicates that the free multimedia message resources in the current communication package are relatively abundant. Then the second sending module 36 can send the multimedia-message to be sent by using the multimedia message. It can avoid additional charges and guarantee the timeliness of multimedia-messages.

The embodiment of the present disclosure further provides an electronic device, including a memory and a processor, and the processor executes a method for sending a multimedia-message according to any embodiment of the present disclosure by calling a computer program stored in the memory.

Figure 6:
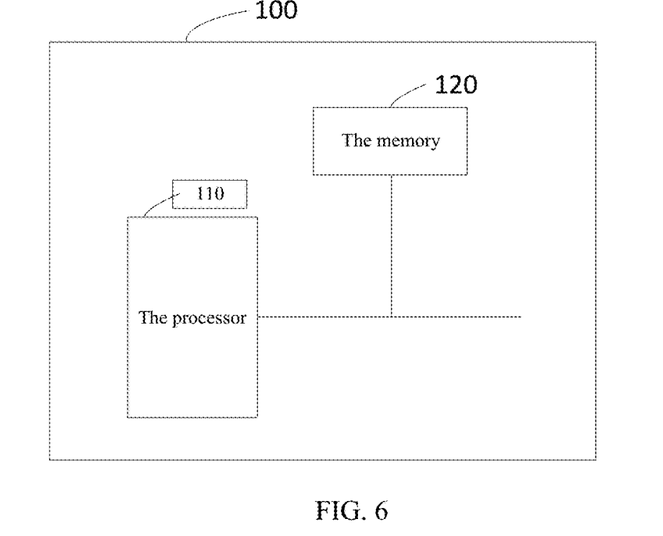
FIG. 6 is a schematic structural diagram of an electronic device according to an embodiment of the present disclosure.

The electronic device can be a device such as a smart phone, a tablet computer, or a palmtop computer. As shown in FIG. 6, the electronic device 100 includes a processor 110 having one or more processing cores, a memory 120 having one or more computer readable storage media, and the computer program can store on the memory 120 and run on the processor 110. The processor 110 is electrically connected to the memory 120. It will be understood by those skilled in the art that the electronic device structure illustrated in FIG. 6 does not constitute a limitation on the electronic device, and may include more or less components than those illustrated, or a combination of certain components, or different component arrangements.

The processor 110 is a control center of the electronic device 100, and connects various parts of the entire electronic device using various interfaces and lines, executes the electronic by running or loading an application stored in the memory 120, and calling data stored in the memory 120 to performing various functions and processing data of the electronic device 100. And then provide overall monitoring of the electronic device 100.

In the embodiment of the present disclosure, the processor 110 in the electronic device 100 loads the instructions corresponding to the process of one or more applications into the memory 120 according to the following operations, and run the applications stored in the memory 120 to implement various functions of:

obtaining a multimedia-message to be sent;

storing the multimedia-message to be sent into a cache, when the RCS of the electronic device is not in an online state;

sending the multimedia-message in the cache by a manner of IM, when the waiting time for transmission is less than a preset time and an online notification of the RCS is received; and sending the multimedia-message in the cache by a manner of MMS, when the waiting time for transmission reaches the preset time and the online notification of the RCS is not received.

In some embodiments, the processor 110 is configured to send the multimedia-message in the cache by a manner of IM, when the waiting time for transmission is less than the preset time and a receiving of the notification of the RCS online, the processor 110 executes:

send the multimedia-message in the cache by a manner of IM according to the order of storing the multimedia-messages in the cache.

In some embodiments, the processor 110 is configured to send the multimedia-message in the cache by a manner of IM, when the waiting time for transmission is less than the preset time and a receiving of the notification of the RCS online, the processor 110 executes:

send the multimedia-message in the cache by a manner of IM, according to an order of the data amount of the multimedia-message in the cache.

In some embodiments, the processor 110 is configured to send the multimedia-message in the cache by a manner of MMS, when the waiting time for transmission reaches the preset time and notification is not received that the RCS is online, the processor 110 executes:

send the multimedia-message in the cache by a manner of MMS, when the waiting time for transmission is greater than and/or equal to the preset time.

In some embodiments, before the processor 110 executes the operation of storing the multimedia-message to be sent into a cache, when the RCS of the electronic device is not in an online state, the processor 110 further executes:

detecting whether the number of a remaining multimedia messages in the current communication package of the electronic device is greater than a preset number;

sending the multimedia-message to be sent by a manner of MMS, when the number of the remaining multimedia messages in the current communication package of the electronic device is greater than a preset number;

storing the multimedia-message to be sent in the cache, when the number of the remaining multimedia messages in the current communication package of the electronic device is less than the preset number or equal to the preset number.

In some embodiments, after the processor 110 executes the operation of obtaining the multimedia-message to be sent, the processor 110 further executes:

sending the multimedia-message to be sent by a manner of IM when the RCS of the electronic device is in an online state.

In some embodiments, the processor 110 is configured to send the multimedia-message in the cache by a manner of IM, when a waiting time for transmission is less than a preset time and a receiving of a notification that the RCS is online, the processor 110 executes:

send the multimedia-message in the cache by a manner of IM according to the data volume of the multimedia-message in the cache from small to large.

Although not shown in FIG. 6, the electronic device 100 may further include a display screen, a camera, a radio frequency circuit, a wireless fidelity module, an input unit, a sensor, a power source, an audio circuit, a Bluetooth module, and the like, and details are not described herein.

In the above embodiments, the descriptions of the various embodiments are different, and the details that are not detailed in a certain embodiment can be referred to the related descriptions of other embodiments.

In the embodiment of the present disclosure, the method of sending the multimedia-message belongs to the same concept as the sending method of the multimedia message in the foregoing embodiment, and the method of sending the multimedia-message can be implemented on the device of sending the multimedia-message. For the specific implementation process of the method provided in the example, refer to the embodiment of the method for sending the multimedia message, and details are not described herein again.

It should be noted that, in the method for sending the multimedia-message of the present disclosure, a common tester in the field can understand all or part of the process for implementing the method for sending the multimedia-message according to the embodiment of the present disclosure, and the related program can be controlled by a computer program. The computer program can be stored in a computer readable storage medium, such as in a memory of the electronic device, and executed by at least one processor in the electronic device, and can include a flow of an embodiment of a method of sending a multimedia message. The storage medium may be a magnetic disk, an optical disk, a read only memory (ROM), a random-access memory (RAM), or the like.

For the device of sending the multimedia-message according to the embodiment of the present disclosure, each functional module may be integrated into one processing chip, or each module may exist separately physically, or two or more modules may be integrated into one module. The above integrated modules can be implemented in the form of hardware or in the form of software functional modules. The integrated modules, if implemented in the form of software functional modules and sold or used as separate products, may also be stored in a computer readable storage medium such as a read only memory, a magnetic disk or an optical disk.

The foregoing describes a method, an apparatus, a storage medium, and an electronic device for sending a multimedia-message according to an embodiment of the present disclosure. The principles and implementation manners of the present disclosure are described in the following. The description is only for helping to understand the technical solution of the present disclosure and its core idea; those of ordinary skill in the art should understand that it can still modify the technical solutions described in the foregoing embodiments, or replace some of the technical features. The modifications or substitutions do not depart from the scope of the technical solutions of the embodiments of the present disclosure.

What is claimed is:

1. A method for sending a multimedia-message applied to an electronic device, comprising:
    obtaining a multimedia-message;
    storing the multimedia-message into a cache as a target message, in response to a Rich Communication Service (RCS) of the electronic device being offline;
    sending the target message as an instant message, when a waiting time for transmission is less than a preset time and an online notification of the RCS is received; and
    sending the target message as an Multimedia Messaging Service (MMS) message, when the waiting time for transmission reaches the preset time and the online notification of the RCS is not received.

2. The method as claimed in claim 1, wherein the operation of sending the target message as an instant message, when a waiting time for transmission is less than a preset time and an online notification of the RCS is received, comprises:
    sending the target message as an instant message, according to an order of storing the target message from first to last.

3. The method as claimed in claim 1, wherein the operation of sending the target message as an instant message, when a waiting time for transmission is less than a preset time and an online notification of the RCS is received, comprises:
    sending the target message as an instant message, according to an order of the data volume of the target message from large to small.

4. The method as claimed in claim 1, wherein the operation of sending the target message as an Multimedia Messaging Service (MMS) message, when the waiting time for transmission reaches the preset time and an online notification of the RCS is not received, comprises:
    sending the target message as an MMS message, when the waiting time for transmission is greater than or equal to the preset time.

5. The method as claimed in claim 1, before the operation of storing the multimedia-message into a cache, in response to a RCS of the electronic device being offline, the method further comprising:
    detecting whether the number of remaining multimedia messages in the current communication package of the electronic device is greater than a preset number;
    sending the multimedia-message as an MMS message, when the number of the remaining multimedia messages in the current communication package of the electronic device is greater than the preset number;
    storing the multimedia-message in the cache as the target message, when the number of the remaining multimedia messages in the current communication package of the electronic device is less than or equal to the preset value.

6. The method as claimed in claim 1, after the operation of obtaining the multimedia-message, the method further comprising:
    sending the multimedia-message as an instant message when the RCS of the electronic device is online.

7. The method as claimed in claim 1, wherein the operation of sending the target message as an instant message, when a waiting time for transmission is less than a preset time and an online notification of the RCS is received, comprises:
    sending the target message as an instant message, according to an order of the data volume of the multimedia-message in the cache from small to large.

8. A storage medium, having a computer program stored therein, when executing the computer program, a computer being enabled to perform a method for sending a multimedia-message, the method comprising:
    obtaining a multimedia-message;
    storing the multimedia-message into a cache as a target message, in response to a Rich Communication Service (RCS) of the electronic device being offline;
    sending the target message as an instant message, when a waiting time for transmission is less than a preset time and an online notification of the RCS is received; and
    sending the target message as an Multimedia Messaging Service (MMS) message, when the waiting time for transmission reaches the preset time and the online notification of the RCS is not received.

9. An electronic device, comprising a memory and a processor, when invoking a computer program stored in the memory, the processor is configured to perform the operations of:
    obtaining a multimedia-message;
    storing the multimedia-message into a cache as a target message, in response to a RCS of the electronic device being offline;
    sending the target message as an instant message, when a waiting time for transmission is less than a preset time and an online notification of the RCS is received; and
    sending the target message as an MMS message, when the waiting time for transmission reaches the preset time and the online notification of the RCS is not received.

10. The electronic device as claimed in claim 9, wherein the processor is further configured to:
    send the target message as an instant message according to an order of storing the multimedia-messages in the cache from first to last.

11. The electronic device as claimed in claim 9, wherein the processor is further configured to:
    send the target message as an instant message, according to an order of the data volume of the target message from large to small.

12. The electronic device as claimed in claim 9, wherein the processor is further configured to:

send the target message as an MMS message, when the waiting time for transmission is greater than or equal to the preset time.

13. The electronic device as claimed in claim 9, wherein the processor is further configured to:
    detect whether the number of remaining multimedia messages in the current communication package of the electronic device is greater than a preset number;
    send the multimedia-message as an MMS message, when the number of the remaining multimedia messages in the current communication package of the electronic device is greater than the preset number;
    store the multimedia-message in the cache as the target message, when the number of the remaining multimedia messages in the current communication package of the electronic device is less than or equal to the preset number.

14. The electronic device as claimed in claim 9, wherein the processor is further configured to:
    send the multimedia-message as an instant message when the RCS of the electronic device is online.

15. The electronic device as claimed in claim 9, wherein the processor is further configured to:
    send the target message as an instant message according to an order of the data volume of the target message from small to large.

16. The method as claimed in claim 1, after the operation of obtaining the multimedia-message, the method further comprising:
    determining whether the RCS of the electronic device is online.

17. The method as claimed in claim 16, wherein the operation of determining whether the RCS of the electronic device is online comprises:
    determining the RCS of the electronic device is online, by detecting whether the instant messaging (IM) service of the electronic device normally works.

18. The method as claimed in claim 16, wherein the operation of determining whether the RCS of the electronic device is online comprises:
    detecting whether the electronic device provides a valid configuration file; and
    determining the RCS of the electronic device is offline when the electronic device fails to provide a valid configuration file.

19. The method as claimed in claim 16, further comprising:
    detecting whether a valid configuration file is provided;
    detecting whether the network of the electronic device is connected when the electronic device provides the valid configuration file; and
    determining the RCS of the electronic device is offline when the network of the electronic device is disconnected.

20. The method as claimed in claim 16, further comprising:
    detecting whether a valid configuration file is provided;
    detecting whether the network of the electronic device is connected when the electronic device provides the valid configuration file;
    detecting whether the electronic device registers to the IP Multimedia Core Network Subsystem (IMS) network of the RCS when the network of the electronic device is connected;
    determining the RCS of the electronic device is online when the electronic device successfully registers to the IMS network of the RCS; and
    determining the RCS of the electronic device is offline when the electronic device fails to register to the IMS network of the RCS.

\* \* \* \* \*